United States Patent [19]

Wu

[11] 4,323,963
[45] Apr. 6, 1982

[54] HARDWARE INTERPRETIVE MODE MICROPROCESSOR

[75] Inventor: Chin T. Wu, North Brunswick, N.J.

[73] Assignee: RCA Corporation, New York, N.Y.

[21] Appl. No.: 57,497

[22] Filed: Jul. 13, 1979

[51] Int. Cl.³ .................................................. G06F 9/30
[52] U.S. Cl. ............................................................. 364/200
[58] Field of Search ... 364/200 MS File, 900 MS File, 364/300

[56] References Cited

U.S. PATENT DOCUMENTS

| | | | |
|---|---|---|---|
| 3,162,841 | 12/1964 | Holleran | 364/200 |
| 3,290,656 | 12/1966 | Lindquist | 364/200 |
| 3,295,102 | 12/1966 | Neilson | 340/146.2 |
| 3,348,210 | 10/1967 | Ochsner | 364/200 |
| 3,739,345 | 6/1973 | Janssens et al. | 364/200 |
| 3,868,649 | 2/1975 | Sato et al. | |
| 3,938,103 | 2/1976 | Welin | 364/200 |
| 3,943,495 | 3/1976 | Garlic | |
| 3,972,024 | 7/1976 | Schroeder et al. | 364/200 |
| 3,972,028 | 7/1976 | Weber et al. | 364/200 |
| 3,992,702 | 11/1976 | Bailey | 340/173 BB |
| 4,047,247 | 9/1977 | Stanley et al. | 364/200 |
| 4,056,809 | 11/1977 | Hoerning et al. | 364/200 |
| 4,062,058 | 12/1977 | Haynes | 364/200 |
| 4,079,451 | 3/1978 | Woods et al. | 364/200 |
| 4,080,648 | 3/1978 | Asano et al. | 364/200 |
| 4,099,230 | 7/1978 | Mead | 364/200 |
| 4,103,331 | 7/1978 | Thacker | 364/200 |
| 4,128,878 | 12/1978 | Yasuhara et al. | 364/200 |
| 4,167,781 | 9/1979 | Beccia et al. | 364/200 |
| 4,197,589 | 4/1980 | Cornish et al. | 364/200 |

OTHER PUBLICATIONS

*Microprocessors and Microcomputers*, Soucek, Chapter 7, John Wiley & Sons, Inc., 1976, pp. 251-298.
Hilburn et al., *Microcomputers/Microprocessors: Hardware Software, and Applications*, 1976, pp. 338-349.

*Primary Examiner*—Gareth D. Shaw
*Assistant Examiner*—Eddie P. Chan
*Attorney, Agent, or Firm*—Samuel Cohen; Robert L. Troike; Donald W. Phillion

[57] ABSTRACT

In a data processor system comprising memory means containing subroutines each having low level instructions with the last instruction being an INTERPRET instruction, and high level language instructions which point to the starting addresses of said subroutines, a hardware high level language interpret capability comprising first and second program counter means which point respectively to said high level language instructions and to said subroutine instructions, and control and timing means responsive to an INTERPRET instruction to load said second program counter means with the subroutine address contained in the high level language instruction pointed to by said first program counter means. Said second program counter means is responsive to said control and timing means to execute the instructions in said subroutine.

2 Claims, 10 Drawing Figures

| COLUMN I | COLUMN II | | COLUMN III | COLUMN IV | COLUMN V | COLUMN VI |
|---|---|---|---|---|---|---|
| STEPS | STACK | PROGRAM COUNTER | ADDRESS | INSTRUCTION | ADDRESS | INSTRUCTION |
| A | | $X_1$ $X_2$ / FETCH INSTRUCTION | $X_1$ $X_2$ | CALL $Y_1$ $Y_2$ | $Y_1$ $Y_2$ | $Z_1$ $Z_2$ |
| B | $X_1$ | $X_1$ $X_2$ / WRITE MEMORY | | | | |
| C | $X_1$ / $X_2+\Delta$ | $X_1$ $X_2$ / WRITE MEMORY | | MAIN PROGRAM | | SUBROUTINE |
| D | $X_1$ / $X_2+\Delta$ | $X_1$ $Y_2$ / READ MEMORY | | | | |
| E | $X_1$ / $X_2+\Delta$ | $Y_1$ $Y_2$ / READ MEMORY | | | | |

HARDWARE INTERPRETIVE MODE MICROPROCESSOR

This invention relates generally to microprocessors employing interpretive execution of high level instructions and more particularly, pertains to a microprocessor system in which interpretive execution is accomplished primarily by hardware as opposed to prior art software techniques.

In the prior art, programmers programming a microprocessor frequently have organized their programs as a series of subroutine CALL'S since the machine level language instruction set provided is usually too elemental to for the actual application. The main program consists of a series of CALL instructions which can be considered as a program written in a higher level programming language. Instructions in this higher language correspond to subroutines written in the host language of the processor.

In a compiler generated code the higher level language instructions are replaced by a group of elemental instructions which are then supplied to the various portions of the main memory. The original higher level language program is invisible to the processor during execution.

When interpretive execution is employed, the required actions are effected by examining each higher level language instruction during the program execution thereof. Software techniques to perform executions are well known.

However, in the prior art interpretive process, when implemented by software with a series of CALLS, the sole program counter (PC) must be loaded with the subroutine address and the present contents of the program counter PC must be saved while the CALL is being executed. The saving of the PC contents is ordinarily accomplished by placing such contents in a memory stack.

For an 8 bit microprocessor with a hardware CALL instruction and a software stack, for example, the time required for execution is the sum of the opcode fetch and decode, two memory reads to get the 16 bit subroutine address from memory and two memory writes to save the present contents of PC.

On an exit from a subroutine, a RETURN execution causes the PC to be loaded with the saved value of the PC at the time the subroutine CALL occurred. This further adds to the overhead of the CALL instruction by one byte plus the execution of the RETURN instruction which includes another opcode fetch plus two memory reads.

A primary object of the invention is to provide a structure whereby the saving of the address in the program counter PC is not required in a CALL nor is the retrieval of the stored PC value from a memory stack required in a return. A further object is the elimination of the CALL opcode in the main program.

In accordance with a preferred form of the invention there is provided in a data processor comprising a memory means containing subroutines each having low level instructions with the last instruction being an INTERPRET instruction, and high level instructions which point to the starting addresses of said subroutines, a hardware high level language INTERPRET capability comprising first and second program counter means which are the program counters, respectively, for said high level language instructions and for said subroutine instructions. Also provided are control and timing means responsive to an INTERPRET instruction to load said second program counter means with the subroutine address contained in the high level language instruction pointed to by said first program counter means. Said second program counter means is responsive to said control and timing means to execute the instructions in the subroutine whose address has been loaded into said second program counter means.

In the drawings:

FIG. 1 is a simplified block diagram of a prior art microprocessor employing one program counter;

FIG. 2, including A-E, is a listing of the execution steps required by the prior art structure of FIG. 1 when a CALL instruction occurs;

Figures 1, 2:
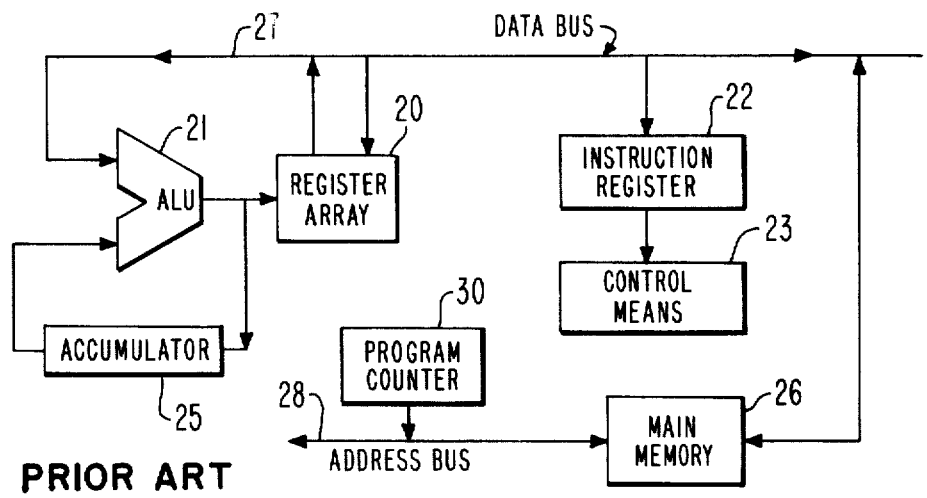

Referring now to FIG. 1 there is shown a simplified block diagram of a prior art microprocessor having only one program counter. The basic building blocks consist of a register array 20, an arithmetic logic unit (ALU) 21, an instruction register 22, a control means 23, an accumulator 25, a main memory 26, a data bus 27, an address bus 28 and a single program counter 30. The function of these basic building blocks of a microprocessor and their interrelation is well known in the art and will not be discussed in detail herein.

The purpose of showing the prior art of FIG. 1 is to facilitate an understanding of FIG. 2 which shows the number of steps required to store the present value of the program counter (PC) 30 of FIG. 1 whenever a CALL instruction occurs and the loading of program counter 30 with the subroutine address and then subsequently the steps required to execute a RETURN instruction at the end of the subroutine and reload the program counter 30 with the value of PC saved at the time of the subroutine CALL instruction.

In FIG. 2, column I shows the changing contents of the memory stack as the CALL instruction is executed in steps A through E, column II shows the contents of the PC, column III shows the addresses of the high level instructions, column IV shows the contents of the high level instructions and columns V and VI show the addresses and instructions of the subroutine which is the subject of the CALL instruction. The steps A-E refer only to columns I and II.

Assuming a one byte code and a two byte address, execution of just the CALL instruction involves the overhead of fetching the one byte opcode and the saving and subsequent updating of a two byte address. For a machine with a hardware CALL instruction and a software stack, which can be realized with the structure of FIG. 1 the time required for execution of the CALL instruction is the sum of: (a) the opcode fetch and decode instruction indicated in step A of FIG. 2, (b) two memory writes into the memory stack as shown in steps B and C, and (c) two memory reads to load the subroutine address $Y_1 Y_2$ in the PC as shown in steps D and E.

The above steps are shown in more generalized form in columns III–VI with column III showing the address $X_1 X_2$ of the instruction pointed by program counter 30 of FIG. 1. The instruction contained in address $X_1 X_2$ is CALL $Y_1 Y_2$, as shown in column IV. $Y_1 Y_2$ is the address of the subroutine, as shown in column V, which, in turn, contains an instruction $Z_1 Z_2$, as shown in column VI.

The subroutines of columns V and VI are then executed using the single program counter 30 of the system. On the exit from the subroutine, a RETURN execution causes the program counter 30 to be loaded with the program counter value saved at the time of the subroutine CALL instruction. This further adds one byte plus the RETURN execution (not shown in FIG. 2) which includes an opcode fetch and decode plus two memory reads to the overhead of the interpretive FETCH operation.

Figure 3:
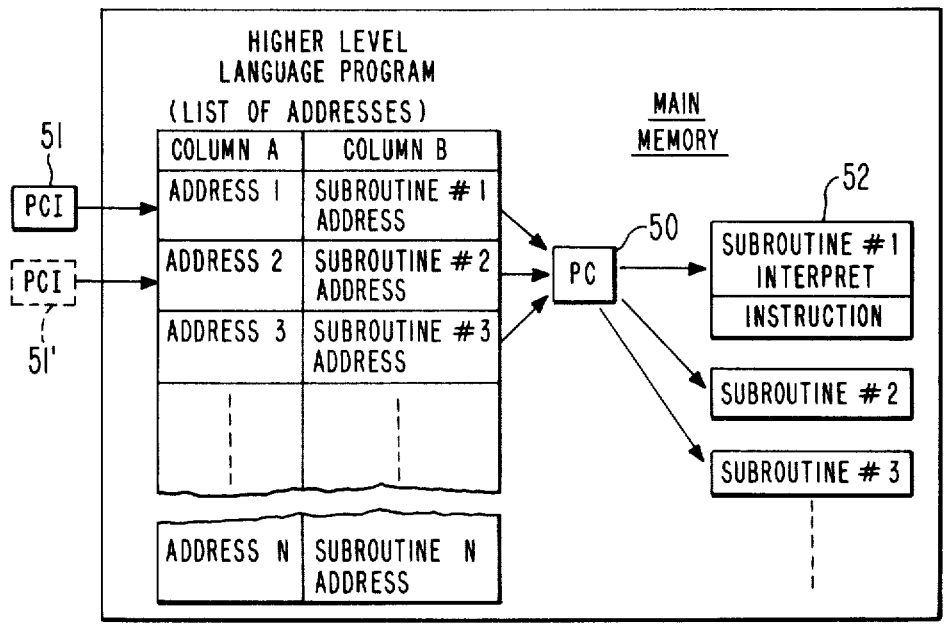
FIG. 3 is a simplified functional block diagram of the present invention illustrating the general relationship between the two program counters in response to the an INTERPRET instruction.

Referring now to FIG. 3 there is shown a basic concept of the present invention which includes two program counters, one designated as program counter (PC) 50 and the other designated as the interpretive program counter (PCI) 51.

The PCI 51 points to a high level language program as indicated in column A of FIG. 3. The contents of memory in these addresses in turn contain addresses of subroutines, as indicated in column B.

While the detailed steps of the execution of an INTERPRET instruction are more complex, as will be discussed later re FIGS. 5 and 6, the ultimate result is that the subroutine address in column B corresponding to addresses pointed to by PCI 51, is entered into PC 50, with PCI 51 being incremented to the next address. PC 50 now points to the starting address of subroutine No. 1, designated by reference character 52. PC 50 remains the program counter for subroutine No. 1 during the execution thereof.

The last instruction of a subroutine, such as subroutine 52, is normally another INTERPRET instruction which begins the cycle anew. More specifically, PCI 51, which has been incremented and is now designated by reference character 51 points to high level address 2, the contents of which comprise the address of subroutine No. 2. PC 50 is then loaded with the address of subroutine No. 2 which will then be incremented to point to address 3.

Figure 4:
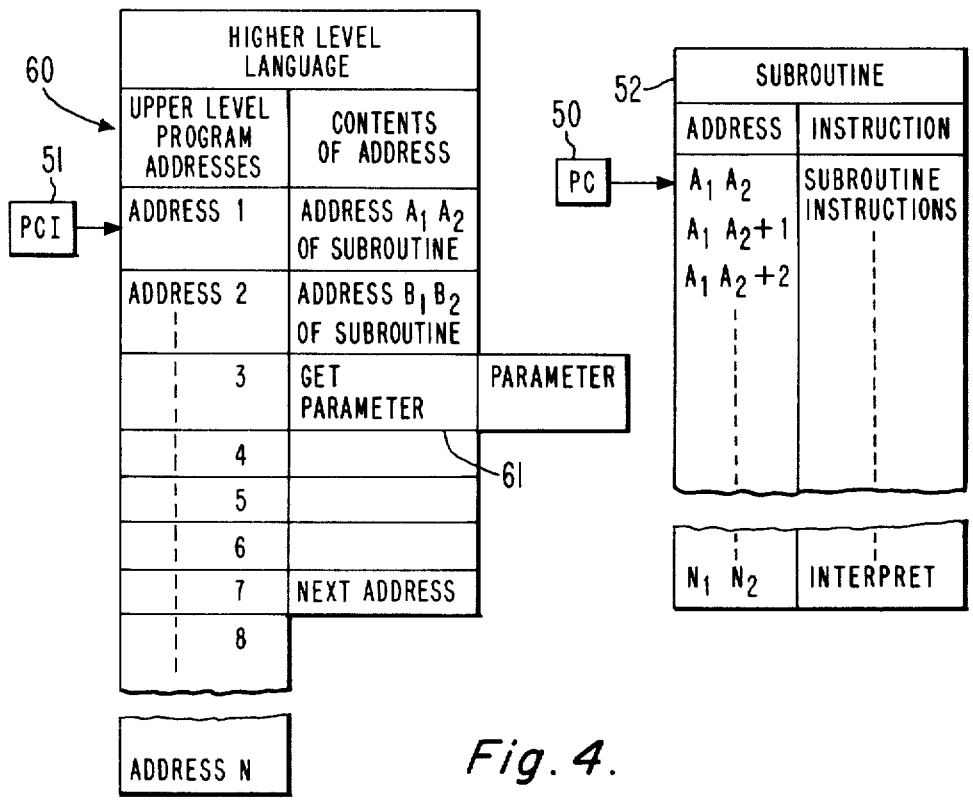
FIG. 4 is another functional block diagram again showing the relationship between the two program counters but in a somewhat different manner.

FIG. 4 is a chart somewhat similar to that of FIG. 3 but which shows subroutine 52 in more detail and also shows that the contents of the address of the higher level language 60 can contain information other than the address of the subroutine, as for example, the GET PARAMETER instruction 61, to be discussed in detail later herein.

In FIG. 4 PCI 51 is shown pointing at address 1 of the higher level language which contains the address $A_1 A_2$ of subroutine 52. The address $A_1 A_2$ of subroutine 52 is entered into PC 50 which will then progressively step through the successive addresses of subroutine 52, such as addresses $A_1 A_2 + 1$ and $A_1 A_2 + 2$, until it reaches the last address $N_1 N_2$. Such last address normally contains a INTERPRET instruction, as indicated in FIG. 4. The INTERPRET instruction in subroutine 52 begins the cycle anew with PCI 51 now pointing at address 2 in the higher level language addresses 60, and PC 50 pointing shortly thereafter to the address $B_1$, $B_2$ of a new subroutine which will then be executed.

Figure 5:
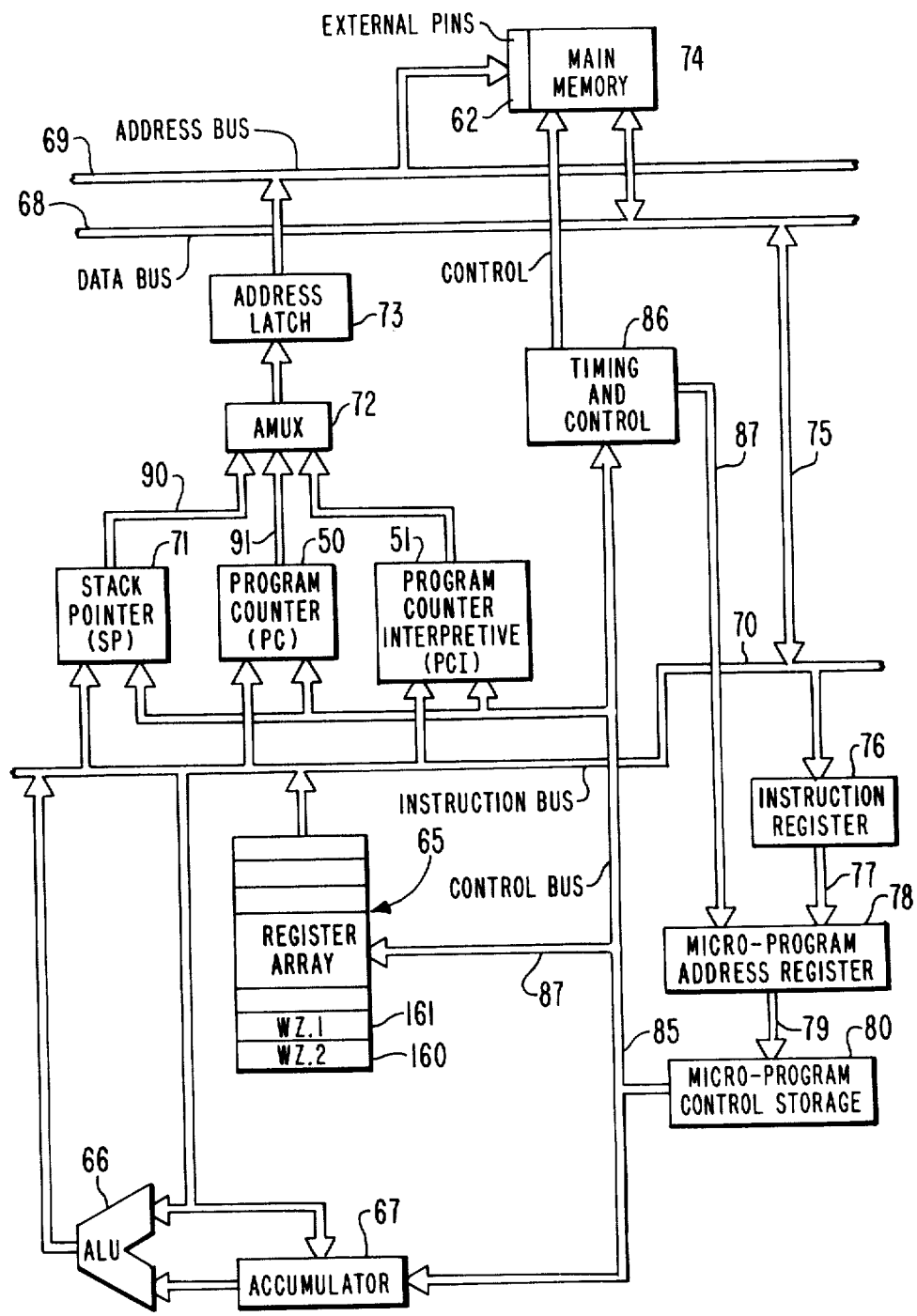
FIG. 5 is a block diagram of the microprocessor of the present invention employing two program counters.

Reference is now made to FIG. 5 which shows a generalized block diagram of a microprocessor containing the two program counters PC 50 and PCI 51, In addition to the two program counters, the block diagram of FIG. 5 contains the usual elements of a microprocessor including a register array 65, an arithmetic logic unit (ALU) 66, an accumulator 67, a stack pointer (SP) 71, a main memory 74, an instruction register 76 into which instructions from the main memory 74 are entered, a timing and control means 86, a micro-program address register 78 which responds to the instruction in instruction register 76 and also to timing and control signals from timing and control means 86 to address certain control means within the micro-program control storage 80. The resulting control signals generated by micro-program control storage 80, in turn, are supplied through control bus 85 to various portions of the microprocessor to execute each step of each timing pulse in each machine cycle, as indicated for example in the detailed flow charts of the various instructions shown in FIGS. 6–10.

In the flow charts of FIGS. 6–10, the particular step occurring during each timing pulse of each machine cycle is shown within a block with each machine cycle and the timing pulses of each machine cycle being shown to the left of the blocks containing the step to be executed.

Figure 6:
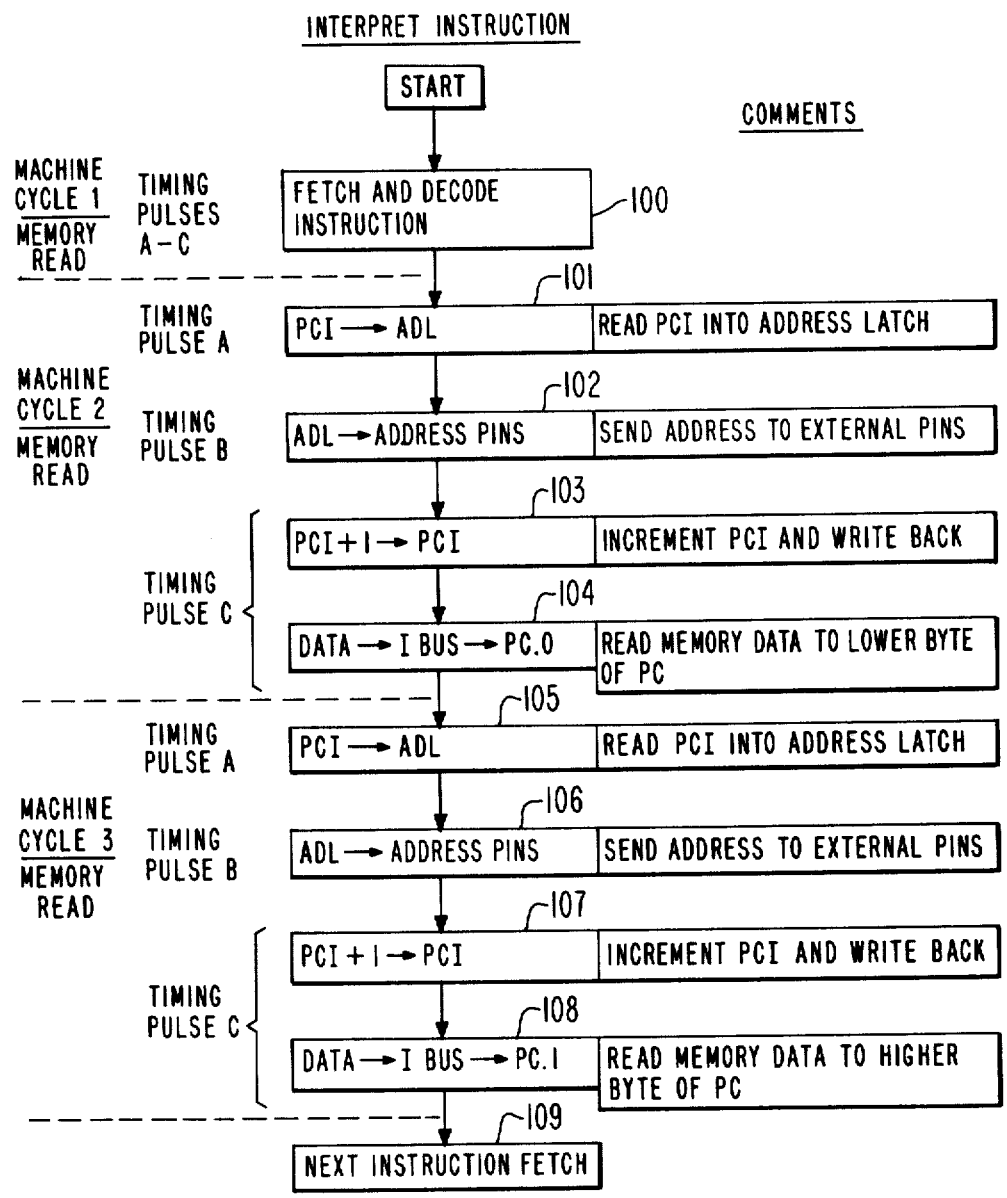
FIG. 6 is a flow chart of the execution steps required to execute an INTERPRET instruction with the structure of FIG. 5.

The discussion of the flow charts of FIGS. 6–10 will be set forth with frequent reference to the block diagram of FIG. 5. Thus, each of the FIGS. 6–10 will be considered along with continuing reference to the structure of FIG. 5. FIG. 6 also has a "comment" column to facilitate understanding of the abreviated nomenclature.

In the execution of the INTERPRET instruction of FIG. 6, PCI 51 (FIG. 5) initially points to a particular instruction in the higher level language stored in main memory 74. PC 50 fetches from main memory 74 the INTERPRET instruction be means of multiplexer 72, address latch 73, and external pins 62. The INTERPRET instruction is supplied from main memory 74 through data bus 68, bus 75, and into instruction register 76 where decoding begins. All of the foregoing operation occurs in a standard manner during the FETCH and DECODE instruction 100 of FIG. 6 and constitutes a conventional memory read.

During machine cycles 2 and 3 PC 50 and PCI 51 interact to point PC 50 towards a selected subroutine without the necessity of saving the contents of PCI 51, other than incrementing the contents of PCI 51 to point to the next high level instruction address.

The first detailed step in the execution of the INTERPRET instruction of FIG. 6 is identified as step 101 wherein, during timing pulse A, the contents of PCI are read into the address latch 73 of FIG. 5. As indicated above, the PCI 51 points to a higher level instruction in main memory 74.

During step 102 of machine cycle 2, the contents of address latch 73 (FIG. 5) are supplied to the external pins 62 (FIG. 5) of main memory 74 through address bus 69 where they are amplified sufficiently to read the contents of such address out of main memory 74. During steps 103 and 104, which occur during timing pulse C of machine cycle 2, PCI 51 is incremented by one. Also one byte of data is read into PC.0, which represents the lower eight-bit positions of the 16-bit position program counter 50. The aforementioned one byte of data is the lower eight bits of the 16-bit address of the subroutine to be executed.

During step 105 of machine cycle 3, the contents of PCI 51 are again read into address latch 73. Next, during step 106, the contents of address latch 73 are sent to the external pins 62 of main memory 74 where they are amplified to a magnitude required to read the contents of the address instruction from main memory 74. During timing pulse C, both steps 107 and 108 occur. In step 107 PCI 51 is again incremented by one and in step 108 the data contained in the address of the high level instruction pointed to by PCI 51 is read into the higher byte position of PC 50, designated as PC.1 in step 108. PC 50 now contains the address of the subroutine which is to be executed and execution thereof is effected. The NEXT INSTRUCTION FETCH occurs, as indicated, in step 109 which corresponds to step 100, the preceding NEXT INSTRUCTION FETCH.

While the INTERPRET instruction calling for the execution of the subroutine is a commonly occurring instruction, it is at times necessary to perform other functions with or upon PCI 51. For example, it is necessary to initially load PCI 51 with the address of a particular starting instruction in the higher level language.

Also, it is sometimes necessary to do conditional branches in the interpretive program itself. This presents some difficulty because the high level address list contains no information regarding an opcode that indicates a branch might be required. However, this problem can be solved effectively by an instruction BRANCH ON CONDITION OF PCI which has the effect of doing a condition check. Depending on whether the condition is met, PCI 51 is either loaded with the contents of the address specified by PCI 51 or else PCI 51 is incremented by the contents of the address specified by PCI 51.

Another function of PCI 51 is to fetch parameters which are then usually supplied to the accumulator 67 of FIG. 5. Parameters can be appended to a high level address much like an operand in an instruction in the interpretive code. They can be fetched with the instruction GET PARAMETER which has the effect of loading the accumulator 67 with a byte specified by PCI 51. The PCI 51 will also be incremented by one to point to the next address in the high level language.

On other occasions, it may be necessary to know the present contents of PCI 51, that is, the memory location to which it points, a fact sometimes required in debugging processes. The foregoing can be accomplished with the instruction STORE PCI which, in effect, saves the contents of PCI 51 in a stack in memory. The detailed steps of the four instructions LOAD PCI, BRANCH ON CONDITION ON PCI, GET PARAMETER and STORE PCI will now be discussed individually.

Figure 7:
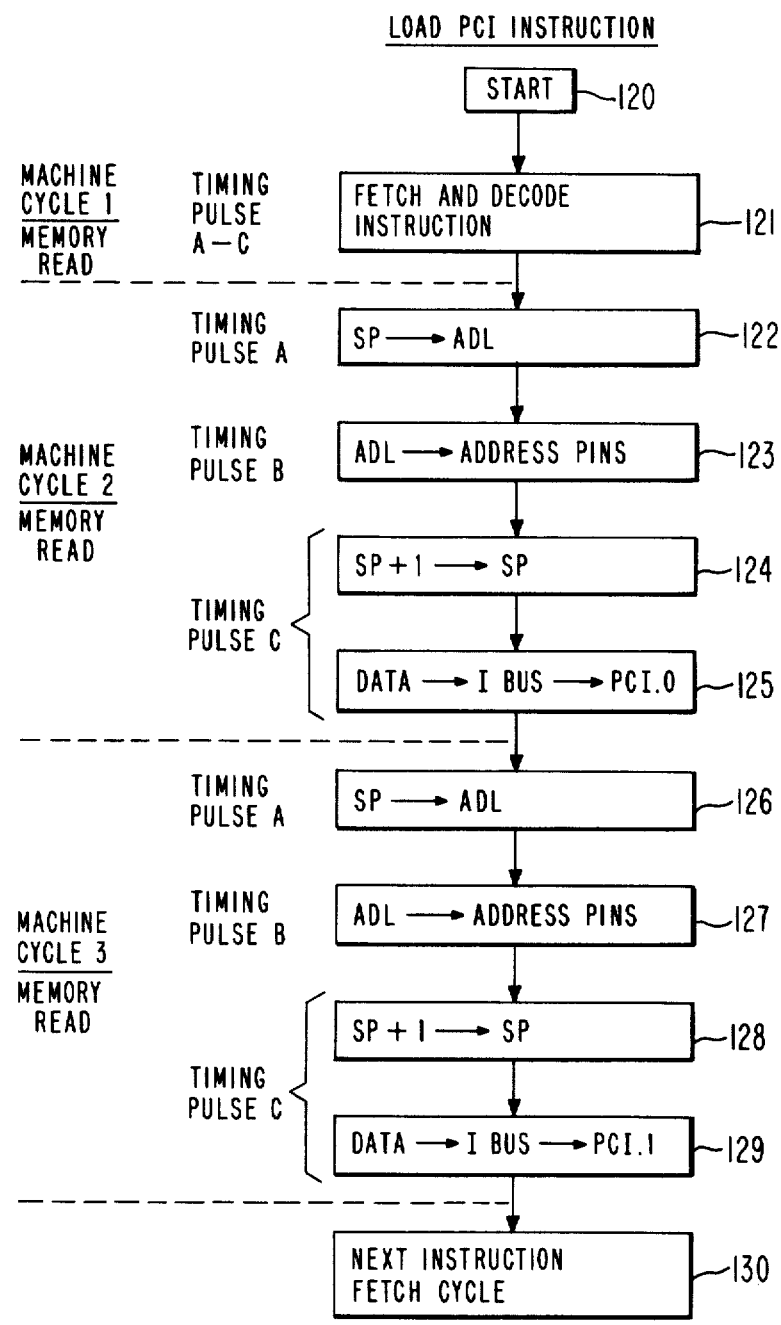
FIG. 7 is a flow chart of the steps required to execute a LOAD PCI instruction with the structure of FIG. 5.

In FIG. 7 the LOAD PCI instruction begins with the memory read FETCH AND DECODE instruction of step 121, which occurs during machine cycle 1.

During step 122 of machine cycle 2, the contents of stack pointer 71 of FIG. 5 are supplied to address latch 73 (FIG. 5) through multiplexer 72. Then, during timing pulse B of machine cycle 2 (step 123) the contents of address latch 73 are supplied to the address pins 62 of memory 74 (FIG. 5) where they are amplified in order to read the contents of the address from main memory 74, as discussed above.

During timing pulse C of machine cycle 2 both steps 124 and 125 occur. In step 124 the stack pointer 71 of FIG. 5 is incremented by one. In step 125 the byte of data contained in the main memory address accessed by stack pointer 71 is entered into the lower eight bit positions (PCI.0) of PCI 51 via instruction bus 70 of FIG. 5.

During the steps 126-129 of machine cycle 3, the second byte pointed to by stack pointer 71 is read from main memory 74 and supplied to the higher byte position PCI.1 of PCI 51. Steps 126-129 are executed in substantially the same manner as steps 122-125, which entered the first byte into the lower byte position PCI.0 of PCI 51 during machine cycle 2. More specifically, during step 126 the contents of stack pointer 71 (FIG. 5) are supplied to address latch register 73. In step 127 the contents of latch register 73 are supplied to address pins 62. Next, in steps 128 and 129, both of which occur during timing pulse C, the stack pointer is incremented by one and the contents of the address pointed to by the stack pointer 71 before being incremented, are supplied to PCI 51 via I bus 70. Then, during step 130, the next instruction is fetched by PC counter 50 in the manner discussed hereinabove.

Figure 8:
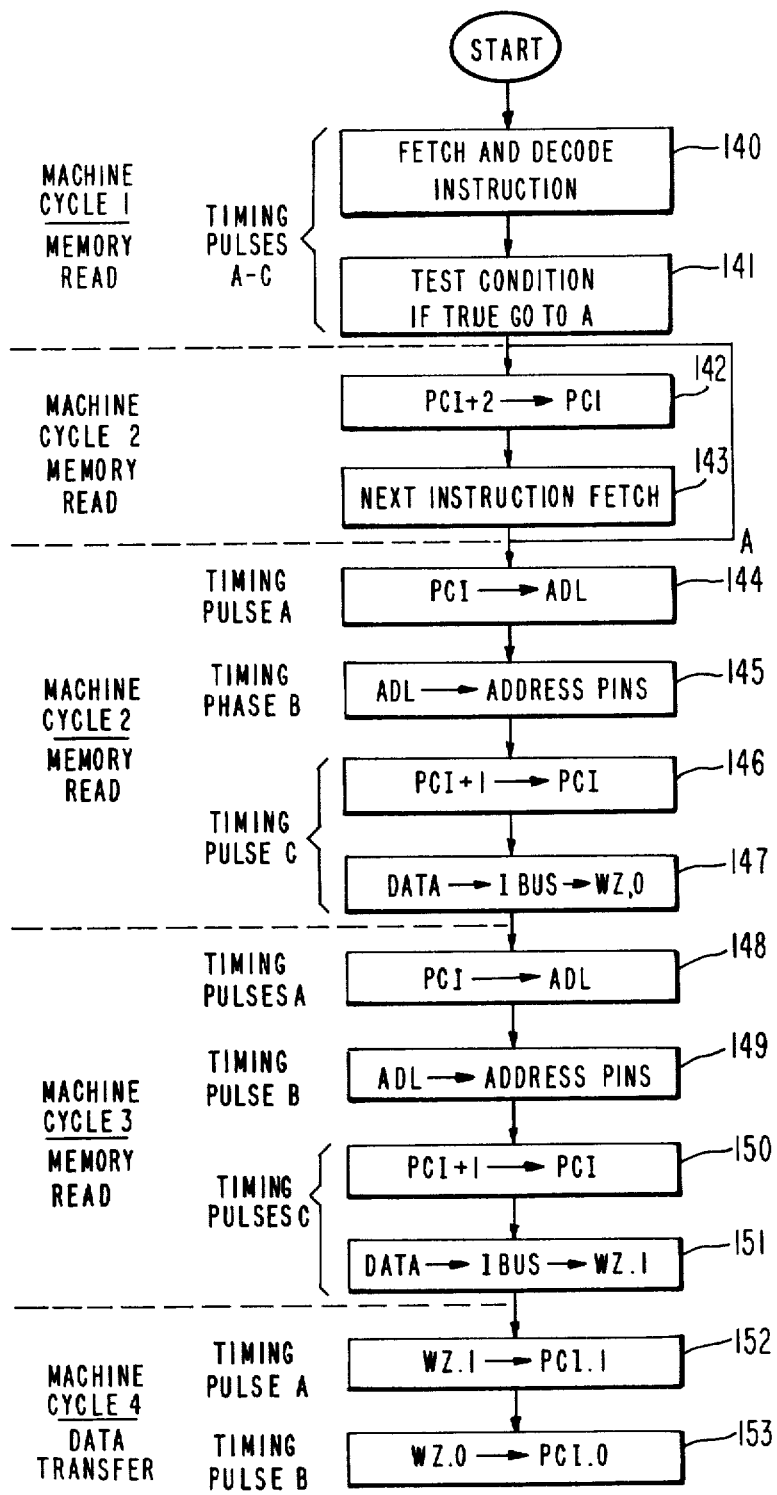
FIG. 8 is a flow chart of the steps required to execute a BRANCH ON CONDITION ON PCI instruction with the structure of FIG. 5.

Referring now to FIG. 8 there is shown a flow chart of the detailed steps of the BRANCH ON CONDITION ON PCI instruction. During the machine cycle 1, PC 50 of FIG. 5 fetches an instruction whose address is pointed to by PCI 51 and supplies it to instruction register 76. In the BRANCH ON CONDITION ON PCI instruction a condition is tested, as indicated in step 141, and if the condition is true the micro-program goes to point A and if not true, it continues to step 142. In step 142 PCI 51 is incremented by 2 and the next INSTRUCTION FETCH occurs, as shown in step 143.

If the test condition is true, then in step 144 the address stored in PCI 51 is supplied to address latch 73. Next, in step 145, the contents of address latch 73 are supplied to the address pins 62 of main memory 74.

In step 146, during timing pulse C, PCI 51 is incremented by one and simultaneously in step 147, the data in the instruction pointed to by PCI 51 is supplied to the WZ.0 register 160 of FIG. 5. Such data is an eight-bit byte comprising the lower byte of the contents of the instruction whose address was pointed to by PCI. During machine cycle 3, as indicated in steps 148, 149, 150 and 151, the steps 140-144 are essentially repeated except that the byte of the instruction pointed to by PCI 51 is supplied to register WZ.1, identified by reference character 161 of FIG. 5. During steps 152 and 153 of machine cycle 4, the contents of WZ.1 and WZ.0 are transferred back to PCI.1 and PCI.0 of PCI 51.

Thus, the contents of PCI 51 have been changed from the address of the instruction pointed to by PCI 51 to the contents of such address by placing the contents of such address in the WZ.0 and WZ.1 registers 160 and 161 and then transferring the contents of such WZ registers 160 and 161 back into PCI 51.

Figure 9:
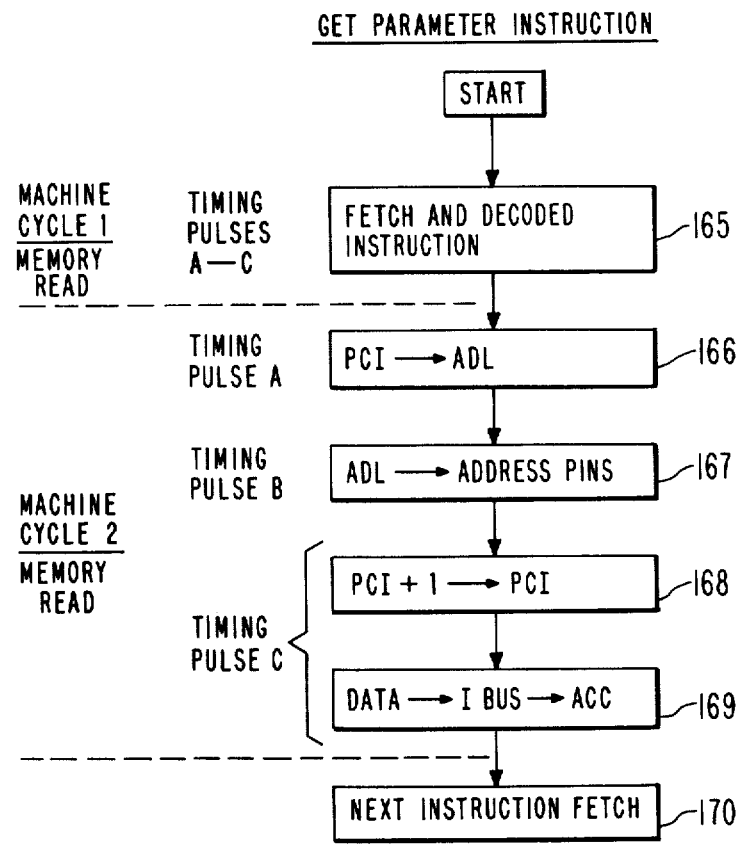
FIG. 9 is a flow chart of the steps required to execute a GET PARAMETER instruction with the structure of FIG. 5.

Reference is now made to FIG. 9 which shows the detailed steps of the GET PARAMETER instruction. The initial step 165 during machine cycle 1 is to fetch and decode the said GET PARAMETER instruction pointed to by PC 50. Subsequently, during step 166 of machine cycle 2, the contents of PCI 51, which again is an address of a high level instruction in main memory 74, are supplied to address latch 73 whose contents are then, in turn, supplied to the external pins 62 in step 167. Subsequently, in step 168 PCI 51 is incremented by one and during the same timing pulse C, in step 169, the data contained in the address pointed to by PCI is supplied to the accumulator 67 through instruction bus 70. The data supplied to accumulator 67 can then be operated on by some value in ALU 66 in accordance with the nature of the next instruction, as shown in step 170.

Figure 10:
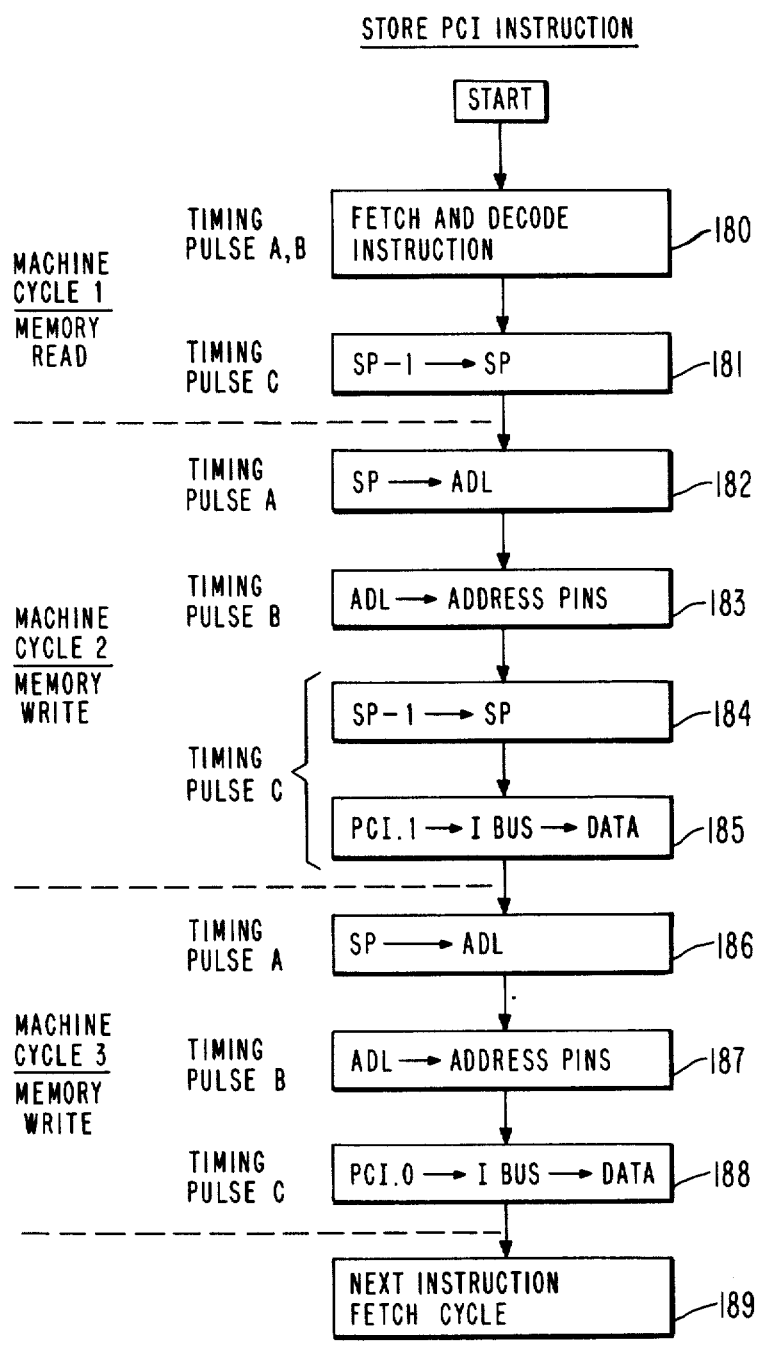
FIG. 10 is a flow chart of the steps required to execute a STORE PCI instruction with the structure of FIG. 5.

Referring to FIG. 10, there is shown the detailed steps of the STORE PCI INSTRUCTION. During step 180 of machine cycle 1 the instruction is fetched by PC 50 and supplied to instruction register 76 and subsequently decoded. Next, during step 181, the stack register pointer 71 is decremented by one in order to prepare for the reception of the upper byte of the contents of PCI 51, which occurs during machine cycle 2.

During step 182 of machine cycle 2 the contents of the decremented stack pointer are supplied to address latch 73 and then in step 183, the contents of latch register 73 are supplied to address pins 62 of main memory 74 where the signals are amplified.

In step 184, during timing pulse C, the stack pointer is again decremented by one and simultaneously, in step 185, the contents of the higher byte of PCI 51 is supplied via instruction bus 70 into the memory location pointed to by stack pointer 71 immediately prior to the decrementing thereof.

The steps 186, 187 and 188 in machine cycle 3 perform essentially the same function as steps 182-185 except that it is not necessary to decrement the stack pointer again. More specifically the steps 186-188 function to supply the lower byte contained in PCI 51 into the memory location pointed to by stack pointer 71 through instruction bus 70.

It is to be noted that the invention consists essentially of the co-action of the two program counters 50 and 51 so that one of them, PCI 51, the interpretive program counter, continues to point a successive high level instructions or to a nonsuccessive high level instruction when a BRANCH ON CONDITION ON PCI instruction occurs, whereas PC 50 is employed primarily to point to subroutines and initiate execution of succeeding instructions of such subroutines. The PCI 51 is also employed to get parameters found in the contents of certain high level instructions. It is, of course, also necessary to initially load PCI 51 with a starting instruction address, and to occasionally store the contents of PCI for debugging purposes.

I claim:

1. In a data processor comprising memory means containing subroutines each having low level instructions with the last instruction being an INTERPRET instruction, and high level language instructions which point to memory locations in said memory means containing the starting addresses of said subroutines said data processor having, a hardware high level language interpret capability and further comprising:

first and second program counter means which point respectively to said high level language instructions and to said subroutine instructions;

control and timing means responsive to said INTERPRET instruction to load said second program counter means with the subroutine starting address contained in the memory location accessed by the high level language instruction pointed to by said first program counter means;

said second program counter means responsive to signals generated by said control and timing means to act as program counter and point to the instructions in said subroutine; and in which predetermined ones of said subroutines contain a BRANCH ON CONDITION ON PCI instruction which tests a condition and in which said control and timing means is responsive to said BRANCH ON CONDITION ON PCI instruction, when said tested condition is true and followed by said INTERPRET instruction, to load said first program counter means with the address contained in the next high level instruction pointed to by said first program counter means, and is further responsive to said BRANCH ON CONDITION ON PCI when said tested condition is false to increment said first program counter means to skip said next high level language instruction.

2. In a data processor comprising a main memory containing subroutines having machine level instructions with at least some of said subroutines having as their last instruction an INTERPRET instruction, and also containing high level language instructions whose contents contain the starting addresses of said subroutines, and instruction register means for receiving said machine level instructions said data processor having, a hardware high level language interpret capability and further comprising:

timing and control means responsive to an INTERPRET instruction in said instruction register means to generate first control signals;

first and second program counter means which point to the said high level instructions and to said subroutines, respectively, first means responsive to and cooperative with said first control signals to fetch the contents of the high level instruction pointed to by said first program counter means from said main memory and to load said contents into said second program counter means; and said timing and control means and said second program counter means responsive to the loading of said contents into the said second program counting means to enable the execution of said subroutine under control of said second program counter means and said timing and control means; and in which predetermined ones of said subroutines contain a BRANCH ON CONDITION ON PCI instruction which tests a condition and in which said timing and control means is responsive to said BRANCH ON CONDITION ON PCI and said tested condition when said tested condition is true to generate second control signals, second means responsive to said second control signals to load said first program counter means with the address contained in the next high level instruction pointed to by said first program counter means, and said second means is further responsive to said BRANCH ON CONDITION ON PCI and said tested condition when said tested condition is false to increment said first program counter means to skip said next high level instruction.

* * * * *